United States Patent
Giakoumelis et al.

(10) Patent No.: US 9,667,674 B2
(45) Date of Patent: *May 30, 2017

(54) METHOD, DEVICE, AND SYSTEM FOR CONNECTING TO A COMMUNICATION DEVICE

(71) Applicant: Unify GmbH & Co. KG, Munich (DE)

(72) Inventors: Emmanouil Giakoumelis, Glyfada (GR); James Smith, Nottingham (GB); Viraj Puranik, Boca Raton, FL (US)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/220,454

(22) Filed: Jul. 27, 2016

(65) Prior Publication Data
US 2016/0337415 A1    Nov. 17, 2016

Related U.S. Application Data

(63) Continuation of application No. 14/377,008, filed as application No. PCT/US2012/070851 on Dec. 20, 2012, now Pat. No. 9,444,931.

(51) Int. Cl.
*H04L 29/06* (2006.01)
*H04M 3/42* (2006.01)
*H04M 7/00* (2006.01)

(52) U.S. Cl.
CPC ...... *H04L 65/1096* (2013.01); *H04L 65/1006* (2013.01); *H04L 65/1063* (2013.01); *H04L 65/1069* (2013.01); *H04L 65/1073* (2013.01); *H04M 3/42195* (2013.01); *H04L 63/02* (2013.01); *H04M 7/006* (2013.01)

(58) Field of Classification Search
CPC .............. H04L 29/06183; H04L 65/10; H04L 29/0619; H04L 29/06278; H04L 29/06285; H04L 29/06312; H04L 29/06306; H04L 29/06387; H04M 1/72597; H04M 3/42195; H04M 3/5231
See application file for complete search history.

(56) References Cited

U.S. PATENT DOCUMENTS 9,444,931 B2 * 9/2016 Giakoumelis ....... H04L 65/1006
2009/0006633 A1  1/2009 Moore
(Continued)

OTHER PUBLICATIONS

The International Search Report for PCT/US2012/070851 dated Sep. 24, 2013.

(Continued)

*Primary Examiner* — Benjamin H Elliott, IV
(74) *Attorney, Agent, or Firm* — Buchanan Ingersoll & Rooney PC

(57) ABSTRACT

A method and apparatus include a first server that communicates with a second server to cause a call back request to be communicated to an endpoint so that the endpoint can initiate a call back connection with the first server or a third server. Such a call back connection may occur near real time or in substantially real time so that updates can be supplied to an endpoint running an application supported by the server quickly and efficiently. The endpoint may register with the second server such that the second server is able to utilize notification messages for providing call back request information to the endpoint to advise the endpoint of a call back request.

16 Claims, 4 Drawing Sheets

(56) References Cited

U.S. PATENT DOCUMENTS

| | | | |
|---|---|---|---|
| 2010/0040216 A1* | 2/2010 | Chida | H04M 1/57 379/142.17 |
| 2010/0235516 A1 | 9/2010 | Nakamura et al. | |
| 2012/0036269 A1 | 2/2012 | Kasuga et al. | |
| 2012/0324041 A1 | 12/2012 | Gerber et al. | |
| 2014/0256299 A1 | 9/2014 | Nakamura et al. | |
| 2015/0023251 A1* | 1/2015 | Giakoumelis | H04L 65/1006 370/328 |

OTHER PUBLICATIONS

The Written Opinion of the International Searching Authority for PCT/US2012/070851 dated Sep. 24, 2013.

* cited by examiner

METHOD, DEVICE, AND SYSTEM FOR CONNECTING TO A COMMUNICATION DEVICE

CROSS-REFERENCE TO RELATED APPLICATIONS

This application is a continuation application of U.S. patent application Ser. No. 14/377,008, which was filed on Aug. 6, 2014 and is the U.S. national stage application of International Patent Application No. PCT/US2012/070851, filed on Dec. 20, 2012.

FIELD OF INVENTION

The present invention relates to communication systems that utilize cellular phones, mobile computer devices, tablets, laptops, or other terminal devices. More particularly, the present invention relates to a system, method and device configured to permit a first server to request a connection from, an endpoint to a second server. In one embodiment, an application server may request a connection from an endpoint via a Session Initiation Protocol ("SIP") communication server.

BACKGROUND OF THE INVENTION

SIP devices may offer a wide range of applications and services to users of those devices. Typically, internet technologies and related protocols such as Hypertext Transfer Protocol ("HTTP") and Hypertext Transfer Protocol Secure ("HTTPS") are often the primary method by which applications and services are provided to users of such devices. But, SIP devices usually require a degree of interaction whereby it is necessary for the application server to initiate a communication to the SIP device or to trigger a SIP device to initiate a connection to the application server at any given time.

In corporate communication network environments, it is common for SIP devices to be placed behind a firewall or a network address translation server for security reasons. Such security measures can render the SIP devices inaccessible to an application server though the SIP device may still access the application server by initiating a communication with that server. As a result, the application server may not be able to initiate a communication as required for certain applications, which can cause problems for the SIP device and user trying to utilize such an application. For instance, the application may not be able to perform its operation when the SIP device is not within a corporate network or may not reliably run when the SIP device is in such a network. As another example, the SIP device may only be able to act as a client in the interface to the application server such that the SIP device always has to be the entity that establishes the connection to the application server.

To address such an issue, SIP devices may poll an application server at specific times or predefined intervals. Alternatively, the SIP device may utilize a long polling method that permits the application server to hold a request and wait for information to be available for sending to the device so that that a reduced number of polling requests from the SIP device may need to be sent. Such polling utilizes substantial resources as many messages are transmitted between devices to perform the polling that are often unnecessary. Additionally, a server may need to utilize its resources to address whether an update is needed in response to such polling even when no update is needed. Further, such polling prevents substantially real-time updating of an application occurring as updates only occur on a scheduled bases predefined by the polling schema utilized by the device.

Yet another option is to utilize a contact proxy so that the load associated with supporting the polling of SIP devices can be off loaded by the application server to another device. For instance, the application server may send call back requests to the proxy, which may record the call back requests for different SIP devices. The SIP device may then get a notification via polling of the proxy server and the application server may subsequently receive the requested callback from the SIP device. Use of such a proxy has the same downsides as use of polling noted above as substantial network resources may be used for the transmission of polling messages and also may prevent real-time or substantially real-time updating of the SIP device.

We have determined that an improved communication device, method, and system are needed to improve the ability of SIP capable devices to communicate with different devices such as an application server. Some embodiments of our apparatuses and methods can permit application services to be offered to SIP devices that are behind a firewall or a network address translation server.

SUMMARY OF THE INVENTION

A method, system and communication terminal, and communication apparatus are provided. An embodiment of the method may be configured for initiating a call back connection between a first communication endpoint and a first server. The method may include the step of one of a second server and the first communication endpoint sends a first message to the first server. The first message identifies a first unique identification of the first communication endpoint. The second server is communicatively connected to the first communication endpoint. Subsequently, a second server receives a second message. The second message comprises information directing the first communication endpoint to initiate a call back connection with the first server. The information directing the first communication endpoint to initiate the call back connection with the first server is comprised of the unique identification of the first communication endpoint. The second server sends a third message to the first communication endpoint. The third message comprises at least a portion of the information directing the first communication endpoint to initiate the call back connection with the first server of the second message. In response to receiving the third message, the first communication endpoint initiates the call back connection with the first server.

In some embodiments of the method, the first server sends the second message to the second server. In other embodiments, a third server sends the second message to the second server. The third server may be a contact triggering server, for example.

The information directing the first communication endpoint to initiate the call back connection with the first server can include different types of information to meet a particular set of design criteria. For instance, the information directing the first communication endpoint to initiate the call back connection with the first server can be comprised of a unique request identification defined by the first server for tracking a request to a subsequent call back connection. The information directing the first communication endpoint to initiate the call back connection with the first server may also be comprised of at least one of an address of the first server and an identification of a port of the first server and wherein the second sever sends the first message to the first server.

In some embodiments of the method, the first communication endpoint is communicatively connected to a firewall apparatus. The firewall apparatus and the first communication endpoint may be connected to a first network to which the firewall apparatus provides at least one firewall service. The firewall apparatus may be a network address translation server or a computer device that hosts a firewall, for example.

In some embodiments of the method, the second message may be a SOAP message and the third message may be an SIP NOTIFY message. In other embodiments, the second and third messages may be configured for other types of messaging formats.

Embodiments of the method may also include the step of the first communication endpoint registering with the second server such that the first communication endpoint subscribes to receive messages that the second server receives from the first server. Alternatively, embodiments of the method may include the steps of the first communication endpoint registering with the second server and the first communication endpoint sending a subscription message to the second server so that the first communication endpoint subscribes to receive messages that the second server receives from the first server.

Embodiments of the communication system may include a first communication endpoint, a first server, and a second server. The first server and second server may be communicatively connected. The first communication endpoint and the second server may be communicatively connected. The first communication endpoint may be within a first network. One of the second server and the first communication endpoint may send a first message to the first server. The first message identifies a first unique identification of the first communication endpoint. The second server receives a second message that comprises information directing the first communication endpoint to initiate the call back connection with the first server. The information directing the first communication endpoint to initiate the call back connection with the first server is comprised of the unique identification of the first communication endpoint. The second server sends a third message to the first communication endpoint that comprises at least a portion of the information directing the first communication endpoint to initiate the call back connection with the first server of the second message. In response to receiving the third message, the first communication endpoint initiates the call back connection with the first server.

In some embodiments of the system, the first server sends the second message to the second server. In other embodiments, a third server communicatively connected to the first server sends the second message to the second server.

The information directing the first communication endpoint to initiate the call back connection with the first server may be comprised of a unique request identification defined by the first server for tracking a request to a subsequent call back connection. The information directing the first communication endpoint to initiate the call back connection with the first server may also be comprised of at least one of an address of the first server and a port of the first server.

Some embodiments of the system may also include a firewall apparatus. The firewall apparatus may host at least one firewall service for the first communication endpoint. The firewall apparatus is communicatively connected to the first communication endpoint and the second server. Examples of a firewall apparatus may be a computer device that hosts a firewall service or a network address translation server.

In some embodiments of the system, the first communication endpoint may register with the second server. The first communication endpoint may subsequently send a subscription message to the second server so that the first communication endpoint subscribes to receive messages that the second server receives from the first server.

A communication endpoint is also provided. An embodiment of the communication endpoint may comprise a transceiver unit, non-transitory memory having an application, and a processor unit. The processor unit may be communicatively connected to the memory to execute the application. The processor unit may also be communicatively connected to the transceiver unit. The endpoint may be configured so that at least one of (i) the communication endpoint sends a first message to a first server that hosts a service supporting the application and (ii) the communication endpoint registers with a second server such that the second server sends the first message to the first server. The first message identifies a first unique identification of the communication endpoint. The communication endpoint may receive a second message from the second server that is comprised of at least a portion of information the second server received in a third message from the first server that directs the first communication endpoint to initiate the call back connection with the first server. In response to receiving the second message, the first communication endpoint initiates the call back connection with the first server.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and apparatuses for providing communications between multiple communication devices are shown in the accompanying drawings and certain present preferred methods of practicing the same are also illustrated therein. It should be understood that like reference numbers used in the drawings may identify like components.

DETAILED DESCRIPTION OF PRESENT PREFERRED EMBODIMENTS

Figure 1:
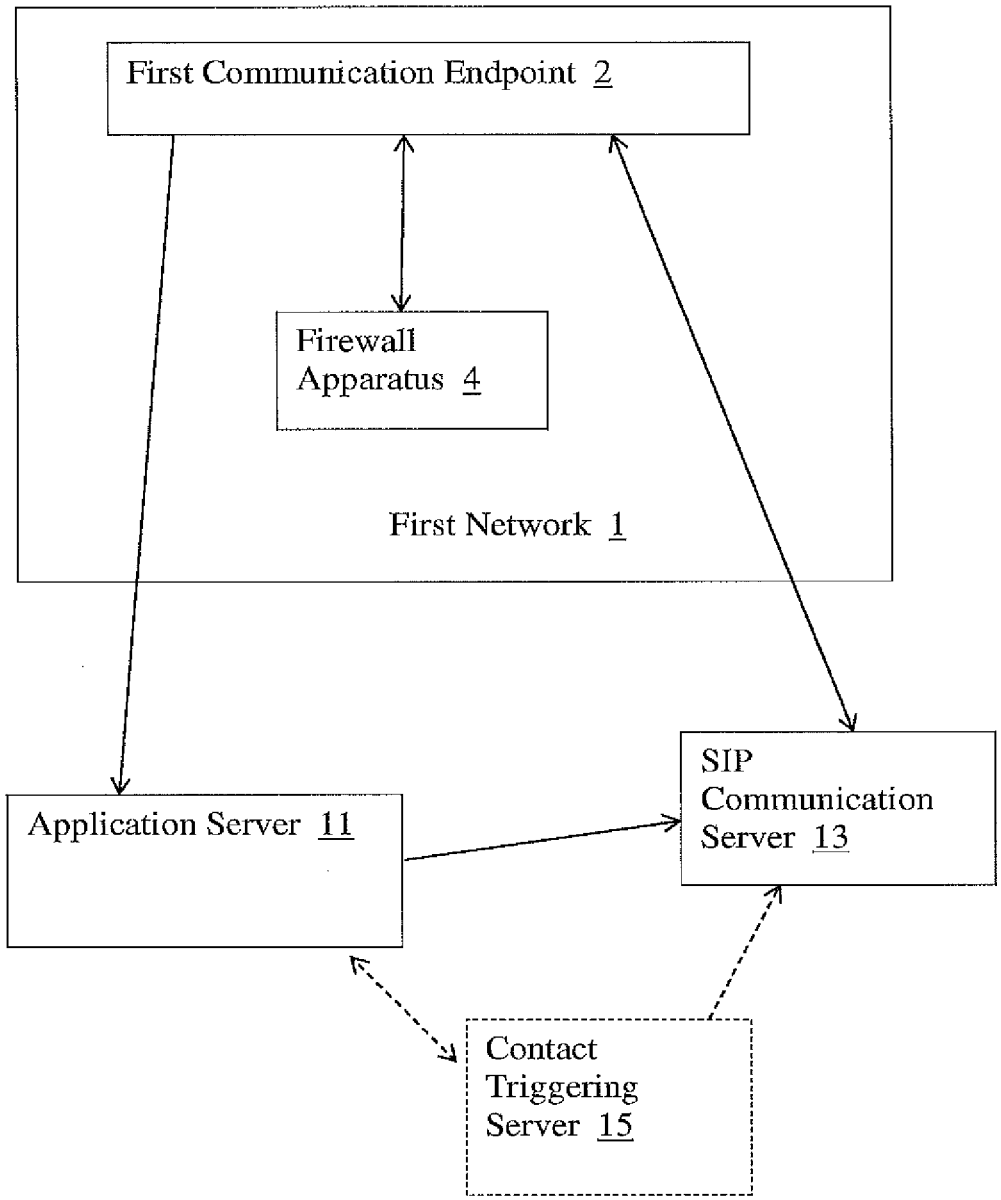
FIG. 1 is block diagram of an exemplary embodiment of a communication system.
Figure 2:
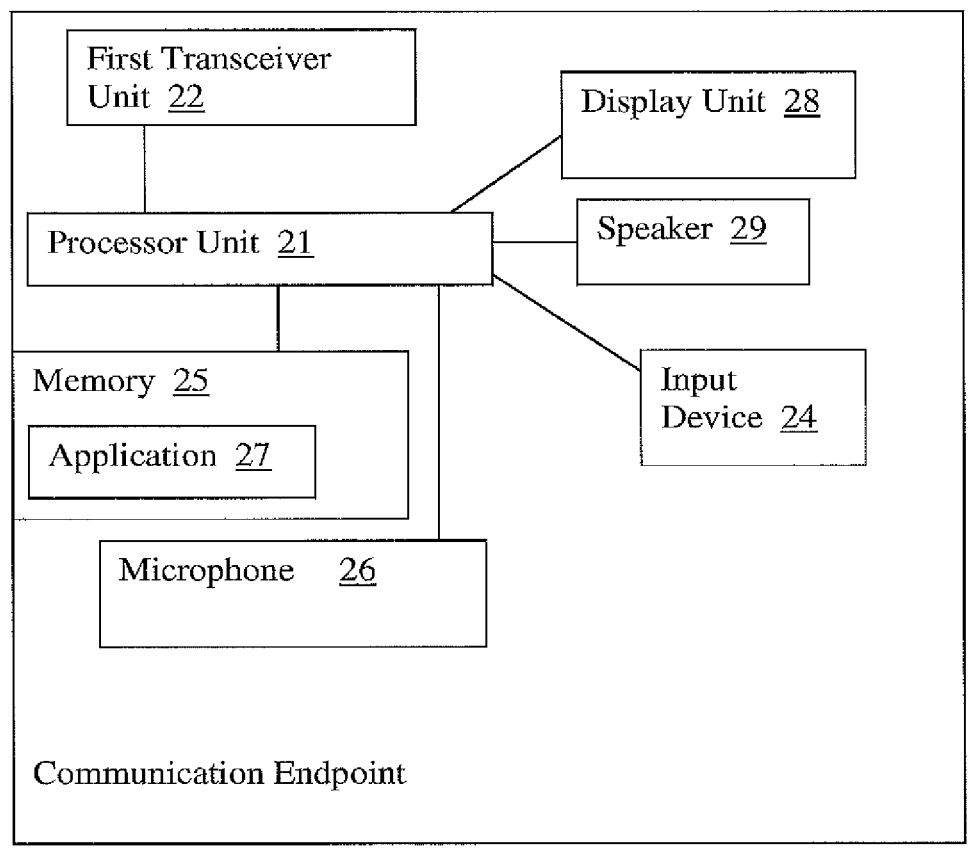
FIG. 2 is a block diagram of an exemplary embodiment of a communication endpoint that may be utilized in embodiments of the system.
Figure 3:
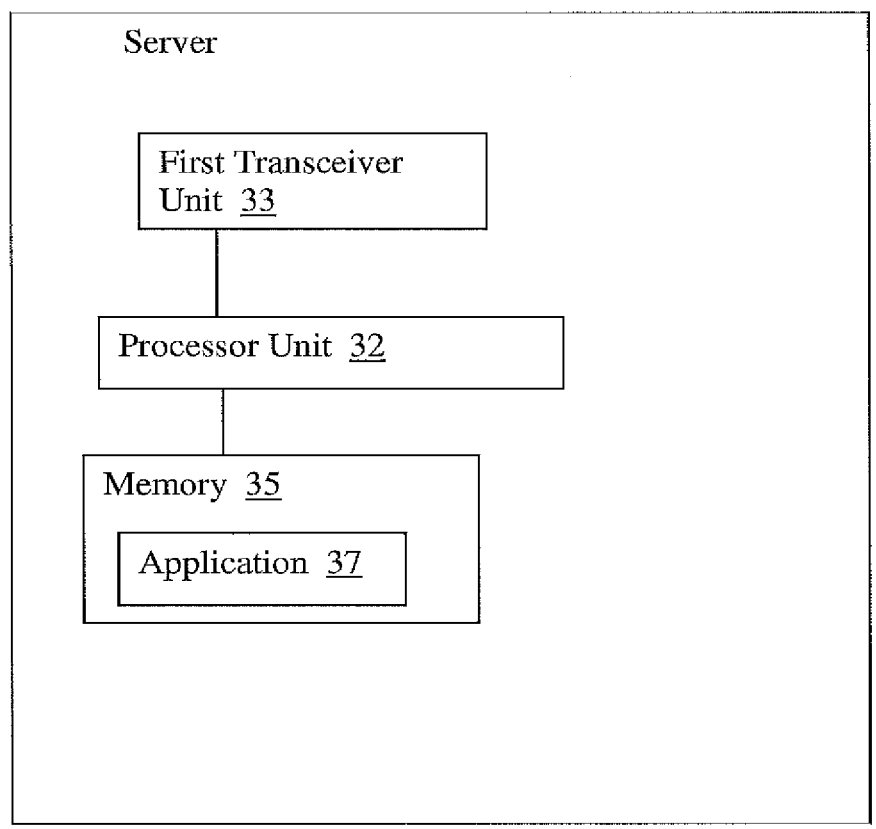
FIG. 3 is a block diagram of a server that may be utilized in embodiments of the communication system. The embodiment of the server shown in FIG. 3 may illustrate an embodiment of the SIP communication server, an embodiment of the application server, or an embodiment of the contact triggering server in an embodiment of the system illustrated in FIG. 1.
Figure 4:
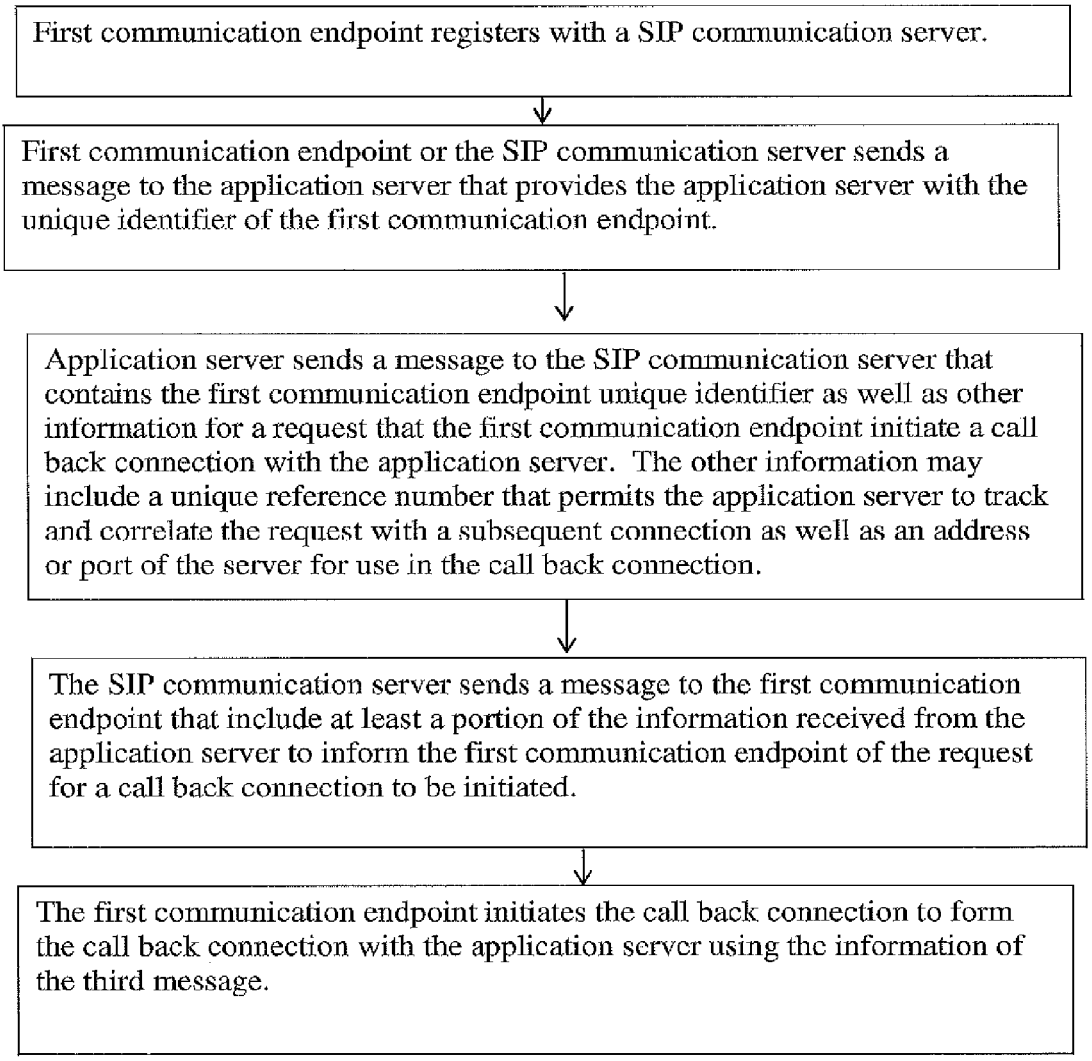
FIG. 4 is a flow chart of an exemplary communication method by which an endpoint can communicate with a server.

Referring to FIGS. 1-4, a communication system may include a communication endpoint 2 of a first network 1. The first network 1 may be a wide area network or local area network such as an enterprise network or private network maintained by a corporation or other business. The first network 1 may also include a firewall apparatus 4 that hosts or helps implement a firewall for the network. The firewall apparatus 4 may include a network address translation ("NAT") server, for example or may include other firewall related nodes for supporting a firewall to provide a level of security to devices of the first network 1.

The first communication endpoint 2 may be an SIP communication endpoint. For instance, the first communication endpoint 2 may be a tablet, a smart phone, a mobile cellular phone, an internet appliance, a laptop computer, a mobile computer device, or other communication terminal. The first communication endpoint 2 may include a processor unit 21 that is communicatively connected to a first transceiver unit 22, at least one input device 24, memory 25, a microphone 26, a display unit 28 and a speaker 29. The first transceiver unit 22 may include a receiver unit and a transmitter unit for transmission and reception of data via a cellular network, a wireless network connection, or other network connection.

The processor unit 21 may be a central processing unit such as a microprocessor, interconnected microprocessors, or other hardware processor element. The speaker 29 may emit audio and the microphone 26 may be an input device that records audio emitted by a user for receiving that audio data. The display unit 28 may be a liquid crystal display or other display device. The display unit 28 may be configured as a touch screen display that functions to output data visually while also permitting a user to provide input by touching different portions of the display. The input device 24 may be a button, keyboard, mouse, or other type of input device a user may utilize to provide input.

The memory 25 may be a non-transitory computer readable medium that has at least one application 27 stored thereon that defines a method that is performed by the endpoint when the processor unit 21 runs or executes the application 27. The memory 25 may include a hard drive, a flash drive, an optical disk or a hard disk or other type of computer readable medium that stores data for a non-transitory period of time.

The first communication endpoint 2 may have an application 27 that requires communication with an application server 11 during the execution of the application. The application server 11 may help facilitate one or more services available to a user of the communication endpoint when running the application 27.

The first communication endpoint 2 may be communicatively connected to an SIP communication server 13 so that it can receive and send messages to the SIP communication server 13. The SIP communication server 13 may communicate with the first communication endpoint 2 to help facilitate the establishment of communication sessions such as phone calls, text messages, or other types of communication sessions.

An optional contact triggering server 15, such as a server that supports another application run on the endpoint, may also be able to communicate with the first communication endpoint 2 via communications with the SIP communication server 13.

The application server 11, SIP communication server 13, and contact triggering server 15 may each include a first transceiver unit 33 that is communicatively connected to a processor unit 32. The processor unit 32 may also be connected to memory, such as non-transitory memory. The memory 35 may have at least one application 37 stored thereon. The application can include program code that defines instructions that define a method that the server performs when the processor unit 32 executes the application 37. It should be understood that the memory 35 may also include one or more databases or other data that contains information that may be accessed to route calls, redirect communications, or provide other services hosted by the server. The first transceiver unit 33 may be configured to permit communications to be established between the server and other devices such as other servers or communication terminal devices. For instance, the server may send data to different communication endpoints via the first transceiver unit so that one or more communication sessions such as application sessions for supporting an application being run on an endpoint may be established or maintained.

Embodiments of the system may be configured so that communication endpoints such as SW endpoints may be notified of a request from an application server for a callback via an SIP request message such as an SIP NOTIFY message with an event package that provides the state of the application server callback requests (e.g. pending or not) for that device. Such a request message may request the endpoint to contact a preconfigured application server based on the event package name identified in the request message. Embodiments of the system may be configured so that such a request message also identifies one or more alternative application server addresses, a path to the application function within the server, a functional component within the application server to communicate with, a time slot for making the call back, a layer 2 protocol to use for the call back connection (e.g. HTTP or HTTPS) or a layer 3 protocol to user for the call back connection (e.g. Application Programming Interface protocol).

The first communication endpoint 2 may register with the SIP communication server 13. By registering with the SIP communication server 13, the first communication endpoint 2 may also subscribe to the event package with the SIP communication server so that the registration also causes the subscription to occur. For example, the first communication endpoint 2 may send an SIP REGISTER message to the SIP communication server that includes an event package name supported by the application server in the accept header filed of the SIP REGISTER message. The name of the event package being included in the accept header of the SIP REGISTER message indicates support of the event package by the first communication endpoint 2.

One example of such an accept header may be "Accept: application/application-server-contact-me. In this example, the event package is called "application-server-contact-me". It should be understood that there are numerous names or other type of indicia such as codes or acronyms that may be used to identify an event package within the SIP REGISTER message. Additionally, it is contemplated that multiple different event packages may be identified for indicating a support of multiple different applications supported by different application servers to which an endpoint may need to communicate.

The SIP REGISTER message from the first communication endpoint may include at least one device identifier (e.g. a Media Access Control ("MAC") address, phone number, or a code identifying an address of the device) that uniquely identifies the endpoint. In the event the endpoint's address does not serve as a unique identifier, it may also include its address in the SIP REGISTER message.

The SIP communication server 13 stores the first communication endpoint 2 identifier provided via the SIP REGISTER message for its registering contact binding. The device identifier is used by the SIP communication server 13 in order to identify a specific device registered with that server in case multiple devices share the same address.

In alternative embodiments, the first communication endpoint 2 may send a separate SIP SUBSCRIBE request to the SIP communication server 13 after registering with this server. The SIP SUBSCRIBE request may identify the one or more application servers or other severs in an event package to which the endpoint requests a subscription. In response to the subscription, the SIP communication server 13 may send notifications or forward messages received from those identified application servers.

The first communication endpoint 2 may be configured so that when it starts up it must send its device identifier to the application server 11 so that the application server 11 may support one or more applications that may be run on one or more endpoints. In some embodiments, it is contemplated that the message sent to the application server 11 may also include an address for the SIP communication server 13 to indicate to the application server 11 that at least certain types of communications that the application server 11 may want to send to the first communication endpoint 2 should be sent by the application server 11 to the SIP communication server 13. In other embodiments, the application server 11 may be preconfigured to know of this contact reference or may alternatively receive a message from the SIP communication server 13 or other network node to advise the application server 11 that call back messages or other messages sent by the application server 11 to the first communication endpoint 2 should be sent to the SIP communication server 13. The SIP communication server 13 could, for example, send at least one message to the application server 11 or otherwise communicate to the application server 11 that the first communication endpoint 2 is registered with the SIP communication server 13 and provide a unique identifier to the application server 11 along with information requesting that the application server 11 send messages intended for the first communication endpoint 2 to the SIP communication server 13.

The message may be sent by the first communication endpoint 2 to the application server 11 at a number of possible times. For example, upon a starting up or turning on of the first communication endpoint 2, the endpoint may send a message to the application server 11 that provides the application server with a message that identifies the endpoints' unique identification. As another option, such a message maybe sent by the first communication endpoint 2 to the application server 11 after the application 27 is first actuated for running on the first communication endpoint 2 after the endpoint is turned on. Such an occurrence may occur at a startup of the endpoint or may occur after the endpoint has started up and has been in use by a user for some period of time.

After the application server 11 receives the message from the first communication endpoint 2 or the SIP communication server 13 that provides the application server 11 with the endpoint's unique identifier and optionally also identifies the SP communication server 13 as a contact reference for the first communication endpoint 2, the application server 11 may determine that an update communication should be sent to the first communication endpoint 2. As a result, the application server 11 may send a callback request message intended for the first communication endpoint 2 to the SIP communication server 13 so that the first communication endpoint 2 may initiate a relatively real-time callback to receive the update as soon as possible. Such a callback request message may be sent as a Simple Object Access Protocol ("SOAP") message that is sent by the application server 11 to the SIP communication server.

The SOAP message sent to the SIP communication server 13 that is intended for the first communication endpoint 2 may include information to indicate to the SIP communication server that the first communication endpoint 2 should be notified that it should establish a connection with the application server 11 to receive an update of information or data. The SOAP message may include, for example, an address of the first communication endpoint 2, the endpoint's unique identifier if that identifier is not the endpoint's address, a request identification that is used by the application server to track and co-relate a notification request to a subsequent connection by the first communication endpoint 2. If provided, the request identification should be a unique identification. The address of the application server 11 such as the IP address of the application server 11, which may be used by the first communication endpoint 2 to establish the requested call back connection to the appropriate server, can also be included in the SOAP message. The address that is provided should be an IP address or a Fully Qualified Domain Name ("FQDN"). In some embodiments, the address of the application server may be omitted if a suitable address is already configured on the endpoint as the address for use when making a call back connection. Additionally, the IP port number that may be used for establishing the requested call back may be provided in the SOAP message to help facilitate the call back connection. The information included in the SOAP message may be included in such a way that is it to be unmodified by the SIP communication server 13 when the server sends such data to the first communication endpoint 2 so that such data is not lost or changed to be inaccurate as such a change or loss of data may result in failing to provide the endpoint with sufficient information for making the requested call back connection.

Whenever the application server 11 determines that it needs to initiate a connection to the first communication endpoint 2 that is not reachable directly by the application server 11, (e.g. the endpoint is not reachable because it can only act as a client or the endpoint is not reachable due to a firewall or NAT server), the application server 11 may send a SOAP message to the SIP communication server 13 that is addressed to the first communication endpoint 2. The first communication endpoint 2 may be identified as the target device in such a message by including the unique identifier of that device to indicate it is the target of the message sent to the SIP communication server 13. The SIP communication server 13 may locate the contact binding based on the received unique identifier of the first communication endpoint 2 and determine that the received identifier matches the identifier for this endpoint. Thereafter, the SIP communication server 13 may send an SIP NOTIFY message for the subscription appropriate to the connection request by the application server 11 to the first communication endpoint 2 that contains information from the SOAP message sent by the application server 11 such as the request identifier, address of the application server, application server port number, or other information indicating a call back connection should be made to the application server 11. When the first communication endpoint 2 receives the SIP NOTIFY message, the endpoint may initiate the call back connection to the requested application server 11. Such a connection may be initiated using an address for the applicable application server that is included within the SIP NOTIFY message, for example. Alternatively, only information indicating a call back connection for a particular application is requested is within the SIP NOTIFY message and the first communication endpoint 2 may use an address preconfigured on the endpoint if no such address is included in the SIP NOTIFY message or even if an address was provided in the SIP NOTIFY message.

The SIP NOTIFY message sent by the SIP communication server 13 to the first communication endpoint 2 may indicate a call back connection is requested based on the information contained therein. For instance, such an SIP NOTIFY message may contain information relating to the event package name that is defined for the application server's usage and a contact me payload that contains the address of the application server, the port of the application server, and a unique request identifier the application server 11 sent to the SIP communication server 13. Below is an example of an SIP NOTIFY message that may be sent by the SIP communication server 13 to the first communication endpoint 2 that has a registered directory number of 7546658000:

NOTIFY sip: 7546658000@192.3.0.1:2307 SIP/2.0
Call-ID: 0892159411-628278608583051-11-65985243
CSeq: 1 NOTIFY
To: sip: 7546658000@192.3.0.1:2307
From sip: 7546658000@10.3.12.142
Event: application-server-contact-me
Max-Forwards: 70
Content-Type: application/application-server-contact-me
Content-Length: 161
Via: SIP/2.0/UDP 10.3.12.142; branch=z9hG4bk_brancha_00234125110017
RequestID=10210
application_server_ip_addr=132.143.12.14
application_server_ip_port=18443

The contact me payload may be provided in any of a number of formats. It should be understood that the payload may also be referred to as a "body". For instance, a simple label-value ABNF structure may be used, but of course other structures such as an XML based body or other structure may be used as alternatives. An example of a simple label value ABNF structure is provided below with the noted hostport and IPv4 address being in accordance with the SIP: Session Initiation Protocol standards set forth in RFC 3261, which is prepared by the Internet Engineering Task Force and is copyrighted by the Internet Society (available at http://www.ietf.org/rfc/rfc3261.txt):

body=[requestid CRLF (appsrv-address CRLF [appsrv-port CRLF])/appsrv-hostport CRLF]
requestid="RequestID" "=" 1*DIGIT
appsrv-address="application_server_ip_addr" "=" IPv4address
appsrv-port="application_server_ip_port" "=" 1*DIGIT
appsrv-hostport=hostport.

It should be understood that the use of the request identification portion of the body may be optional. Additionally, use of carriage return line feed (CRLF) within the body that is set forth in the above example may be optional. Of course, additional variations to the above noted format of the body or payload may also be made to meet a particular set of design criteria.

As noted above, the format of the event package and the contact me payload for the event package should be capable of containing the required information. As one of ordinary skill in the art will appreciate, there are many ways in which such message content may be formatted. It should be understood that the format of such a message may be any type of format that is suitable to meet a particular design objective.

The application server 11 may not directly send the call back request notification message to the SIP communication server 13 for requesting the first communication endpoint 2 to initiate a call back request connection. For example, another server such as a contact triggering server 15 shown in broken line in FIG. 1 may send the message to the SIP communication server to initiate the call back request instead of such a message being sent by the application server. The contact triggering server 15 may provide such a message to support load balancing to help reduce network traffic issues or as part of survivability service in the event a communication failure prevents the application server 11 from sending such a message to the SIP communication server 13. In the event the contact trigger server 15 sends the message to the SIP communication server 13, the message may be a SOAP message similar to the message discussed above. The contact triggering server 15 may know to send such a message based on its independent monitoring of the application server 11 or based upon receipt of a message from the application server 11 requesting the contact triggering server 15 to send such a message for requesting the first communication endpoint 2 to initiate a call back connection. The SIP communication server 13 may respond to such a message from the contact triggering server 15 similarly to how it responds to such a message received from the application server 11 as noted above.

For security reasons, it can be beneficial for the first communication endpoint 2 to allow itself to be configured from an application server 11 identified on a list of trusted application servers or a list of trusted application server addresses. The first communication endpoint 2 may be configured to support a protection option that disables a non-trusted application server's address from being usable.

Embodiments of our communication system, method, device and apparatus may be configured to avoid the polling techniques and their impact on network traffic, which consume execution resources even when there are no waiting requests since the application server must check each device to determine that there are no waiting requests under a polling scheme. Further, near real-time updating and call backs may be achieved as there is no delay in updating or call backs due to a wait for a next scheduled polling time to occur. Further, embodiments of our system, method, device and apparatus permit authenticated SIP interfaces to be utilized and permit an automatically secured communication via an encryption mechanism in use over that SIP interface (e.g. SIP Transport Layer Security ("SIP-TLS")). Further, the SIP NOTIFY requests sent from the SIP communication server can be challenged by the endpoint for authentication form the SIP communication server 13, which further facilitates security of the system.

Embodiments of our communication system, method, device and apparatus are also an improvement over open web socket systems that may be utilized as such sockets can often be open for a long period of time even when notifications only occur infrequently or relatively infrequently. Web sockets are not needed for embodiments of the system for example, and therefore no resources needed for opening a web socket or the maintenance of such web socket is needed. Further, the above noted advantages also provide improved security relative to a web socket based approach.

It should be appreciated that different variations can be made to the above noted embodiments to meet different design objectives. For instance, multiple endpoints may register with the SIP communication server for receiving SIP NOTIFY messages or other message formats that provide instructions to initiate a call back to an application server. As another example, a communication system may have multiple different sets of endpoints and SIP communication servers within the same wide area network. Each set of endpoints and a server to which those endpoints are registered may be within a respective branch network of an enterprise network, for example. As yet another example, the application server 11 may include a plurality of servers that all support the same application or suite of applications that are run on a particular endpoint.

While certain present preferred embodiments of the communication device, communication system, computer readable medium, and methods of making and using the same have been shown and described above, it is to be distinctly understood that the invention is not limited thereto but may be otherwise variously embodied and practiced within the scope of the following claims.

What is claimed is:

1. A method of communication, the method comprising:
a first communication endpoint registering with a second server such that the second server sends a first message to a first server that hosts a service, the first message identifying a first unique identification of the first communication endpoint, the second server having non-transitory memory and a processor and the service hosted by the first server being a service supporting an application run by the first communication endpoint;
in response to receiving a second message from the second server that comprises at least a portion of information that directs the first communication endpoint to initiate a call back connection with the first server, the first communication endpoint initiating formation of the call back connection with the first server; and
wherein the information directing the first communication endpoint to initiate the call back connection with the first server is also comprised of at least one of an address of the first server and a port of the first server.

2. A method of communication, the method comprising:
a first communication endpoint registering with a second server such that the second server sends a first message to a first server that hosts a service, the first message identifying a first unique identification of the first communication endpoint, the second server having non-transitory memory and a processor and the service hosted by the first server being a service supporting an application run by the first communication endpoint;
in response to receiving a second message from the second server that comprises at least a portion of information that directs the first communication endpoint to initiate a call back connection with the first server, the first communication endpoint initiating formation of the call back connection with the first server; and
wherein the portion of the information that directs the first communication endpoint to initiate the call back connection with the first server comprises the first unique identification of the first communication endpoint; and
wherein the information that directs the first communication endpoint to initiate the call back connection with the first server is also comprised of a unique request identification defined by the first server for tracking a request to a subsequent call back connection.

3. A method of communication, the method comprising:
a first communication endpoint registering with a second server such that the second server sends a first message to a first server that hosts a service, the first message identifying a first unique identification of the first communication endpoint, the second server having non-transitory memory and a processor and the service hosted by the first server being a service supporting an application run by the first communication endpoint;
in response to receiving a second message from the second server that comprises at least a portion of information that directs the first communication endpoint to initiate a call back connection with the first server, the first communication endpoint initiating formation of the call back connection with the first server, and
wherein the portion of the information that directs the first communication endpoint to initiate the call back connection with the first server comprises at least one of an address of the first server and an identification of a port of the first server.

4. The method of claim 3, wherein the portion of the information that directs the first communication endpoint to initiate the call back connection with the first server comprises the first unique identification of the first communication endpoint.

5. The method of claim 3, wherein the first communication endpoint registering with the second server is performed such that first communication endpoint subscribes to receive messages that the second server receives from the first server.

6. The method of claim comprising:
the first communication endpoint sending a subscription message to the second server prior to receiving the second message so that the first communication endpoint subscribes to receive messages that the second server receives from the first server.

7. The method of claim 3, wherein:
the first server has a processor and non-transitory memory; and
the second server is configured as a Session Initiation Protocol (SIP) server.

8. A method of communication, the method comprising:
a first communication endpoint registering with a second server such that the second server sends a first message to a first server that hosts a service, the first message identifying a first unique identification of the first communication endpoint, the second server having non-transitory memory and a processor and the service hosted by the first server being a service supporting an application run by the first communication endpoint;
in response to receiving a second message from the second server that comprises at least a portion of information that directs the first communication endpoint to initiate a call back connection with the first server, the first communication endpoint initiating formation of the call back connection with the first server; and
the second server receiving a third message comprising the information that directs the first communication endpoint to initiate the call back connection with the first server prior to the second server sending the second message to the first communication endpoint.

9. The method of claim 8, comprising:
a third server having a processor connected to non-transitory memory sending the third message to the second server.

10. A communication endpoint comprising:
a transceiver unit;
non-transitory memory having an application; and
a processor unit, the processor unit communicatively connected to the memory to execute the application, the processor unit also communicatively connected to the transceiver unit;

at least one of (i) the communication endpoint being configured to send a first message to a first server that hosts a service supporting the application and (ii) the communication endpoint being configured to register with a second server such that the second server sends the first message to the first server, the first message identifying a first unique identification of the communication endpoint;

the communication configured to respond to receiving a second message from the second server that comprises at least a portion of information that directs the first communication endpoint to initiate a call back connection with the first server by initiating formation of the call back connection with the first server, wherein the portion of the information that directs the communication endpoint to initiate the call back connection with the first server comprises at least one of an address of the first server and an identification of a port of the first server.

11. The communication endpoint of claim 10, wherein: the communication endpoint is configured to register with the second server.

12. The communication endpoint of claim 10, wherein the second message is a Session Initiation Protocol NOTIFY message.

13. A communication system comprising:
a first communication endpoint; and
a second server having a processor connected to non-transitory memory, the second server being communicatively connectable to a first server, the first communication endpoint and the second server being communicatively connected, the first communication endpoint being within a first network;
one of the second server and the first communication endpoint configured to send a first message to the first server identifying a first unique identification of the first communication endpoint;
the second server configured to receive a second message, the second message comprising information directing the first communication endpoint to initiate the call back connection with the first server, the information directing the first communication endpoint to initiate the call back connection with the first server comprised of the unique identification of the first communication endpoint;
the second server configured to send a third message to the first communication endpoint, the third message comprising at least a portion of the information directing the first communication endpoint to initiate the call back connection with the first server so that the first communication endpoint initiates the call back connection with the first server in response to receiving the third message; and
wherein the information directing the first communication endpoint to initiate the call back connection with the first server is also comprised of at least one of an address of the first server and a port of the first server.

14. A communication system comprising:
a first communication endpoint; and
a second server having a processor connected to non-transitory memory, the second server being communicatively connectable to a first server, the first communication endpoint and the second server being communicatively connected, the first communication endpoint being within a first network;
one of the second server and the first communication endpoint configured to send a first message to the first server identifying a first unique identification of the first communication endpoint;
the second server configured to receive a second message, the second message comprising information directing the first communication endpoint to initiate the call back connection with the first server, the information directing the first communication endpoint to initiate the call back connection with the first server comprised of the unique identification of the first communication endpoint;
the second server configured to send a third message to the first communication endpoint, the third message comprising at least a portion of the information directing the first communication endpoint to initiate the call back connection with the first server so that the first communication endpoint initiates the call back connection with the first server in response to receiving the third message; and
the first server having non-transitory memory and a processor; and
a firewall apparatus configured to host at least one firewall service for the first communication endpoint, the firewall apparatus communicatively connected to the first communication endpoint and the second server.

15. The communication system of claim 14, wherein the first communication endpoint is configured to send a subscription message to the second server so that the first communication endpoint subscribes to receive messages that the second server receives from the first server.

16. A communication system comprising:
a first communication endpoint; and
a second server having a processor connected to non-transitory memory, the second server being communicatively connectable to a first server, the first communication endpoint and the second server being communicatively connected, the first communication endpoint being within a first network;
one of the second server and the first communication endpoint configured to send a first message to the first server identifying a first unique identification of the first communication endpoint;
the second server configured to receive a second message, the second message comprising information directing the first communication endpoint to initiate the call back connection with the first server, the information directing the first communication endpoint to initiate the call back connection with the first server comprised of the unique identification of the first communication endpoint;
the second server configured to send a third message to the first communication endpoint, the third message comprising at least a portion of the information directing the first communication endpoint to initiate the call back connection with the first server so that the first communication endpoint initiates the call back connection with the first server in response to receiving the third message; and
wherein the information directing the first communication endpoint to initiate the call back connection with the first server is also comprised of a unique request identification defined by the first server for tracking a request to a subsequent call back connection.

* * * * *